J. C. LEGO.
LOCK NUT.
APPLICATION FILED APR. 1, 1922.

1,429,955.

Patented Sept. 26, 1922.

J. C. Lego,
Inventor

Patented Sept. 26, 1922.

1,429,955

UNITED STATES PATENT OFFICE.

JAMES C. LEGO, OF NORTH BALTIMORE, OHIO, ASSIGNOR OF ONE-THIRD TO JACOB K. SMITH, OF NORTH BALTIMORE, OHIO.

LOCK NUT.

Application filed April 1, 1922. Serial No. 548,650.

*To all whom it may concern:*

Be it known that I, JAMES C. LEGO, a citizen of the United States, residing at North Baltimore, in the county of Wood and State of Ohio, have invented a new and useful Lock Nut, of which the following is a specification.

This invention relates to lock nuts and the object thereof is to provide a two part nut of this character with spring means for retaining said parts securely in position.

Another object is to provide a simple and efficient spring connector for a two part nut constructed so that when engaged, it will yieldably clamp the connected parts together.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

In the embodiment illustrated the nut constituting this invention comprises two members 1 and 4 adapted to be mounted on the threaded end of a bolt 15 provided with longitudinally extending grooves as 16 which are designed for a purpose presently to be described.

Figure 1:
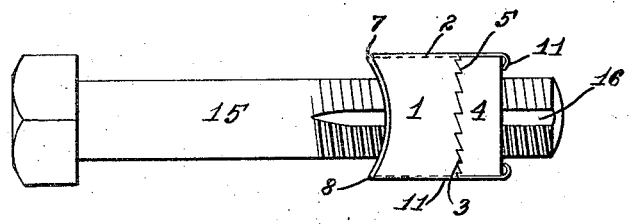
Figure 1 represents a side elevation of a nut constructed in accordance with this invention shown applied.

The nut member 1 is preferably polygonal in cross sectional contour to facilitate the use of a wrench in connection therewith and has a threaded bore for engagement with the threaded end of the bolt 15. This member 1 is provided in its diametrically opposite faces with grooves 2 forming seats for the arms of a spring washer 7 presently to be described. This member 1 is also provided in one face thereof with a plurality of ratchet teeth 3 designed to cooperate with similar teeth 5 on the meeting face of member 4 so that when the members are in assembled position, as shown in Fig. 1, these teeth will interlockingly engage.

The member 4 which is designed to slide freely on the bolt has the bore thereof provided with inwardly extending protuberances 6 shaped to conform to the grooves 16 in the bolt 15 to hold the member 4 against turning on the bolt.

Figure 2:
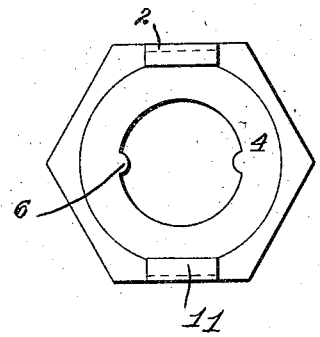
Fig. 2 is an end elevation thereof.
Figure 3:
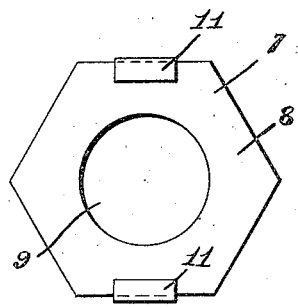
Fig. 3 is a plan view of the spring washer constituting part of the invention.
Figure 4:
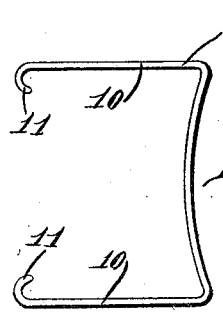
Fig. 4 is a side elevation thereof.

A spring clamping washer 7 is designed to be mounted on the bolt 15 and to connect the members 1 and 4 in engaged position. This washer comprises a plate 8 having a central aperture 9 for the passage therethrough of the bolt 15 and which is preferably bowed inwardly as shown clearly in Figs. 1 and 4 to facilitate the clamping action of the washer when applied. This plate 8 is provided with right angularly disposed arms 10 of a length sufficient to span the thickness of the two members 1 and 4 when applied and they are equipped at their terminals with inturned hooks 11 adapted to engage the outer face of member 4 as is shown clearly in Figs. 1 and 2.

In the application of this nut the washer 7 is first inserted on the bolt then the nut member 10 screwed thereon and the member 4 slipped over the bolt until the teeth thereof mesh with the teeth 3 of member 1, and when in this position the arms 10 of the spring washer 7 are forced into clamping engagement with the outer face of member 4 and securely hold the two members in engaged relation, thereby avoiding all possibility of accidental separation of the members and the consequent unscrewing of the nut.

The arms 10 of the washer 7 are of a thickness corresponding to the depth of the seats 2 formed in the opposed faces of member 1 so that when applied, their outer faces will be flush with the outer faces of the nut member, and thereby prevent interference with a wrench in applying the nut.

I claim:—

A lock nut comprising two members for engagement with a bolt, and a spring washer to fit on the bolt adjacent the outer face of one of said members said washer being bowed inwardly toward the member in connection with which it is to be used and having oppositely disposed right angularly extending arms equipped with terminal hooks to engage the outer face of the other member to lock said members in assembled position.

In testimony that I claim the foregoing as my own, I have hereto affixed my signature in the presence of two witnesses.

JAMES C. LEGO.

Witnesses:
    I. A. ROBINSON,
    J. K. SMITH.